April 28, 1931.  D. T. EWING ET AL  1,802,640
PROCESS FOR THE OXIDATION OF LEUCO BASES FOR DYES
Filed Oct. 7, 1927
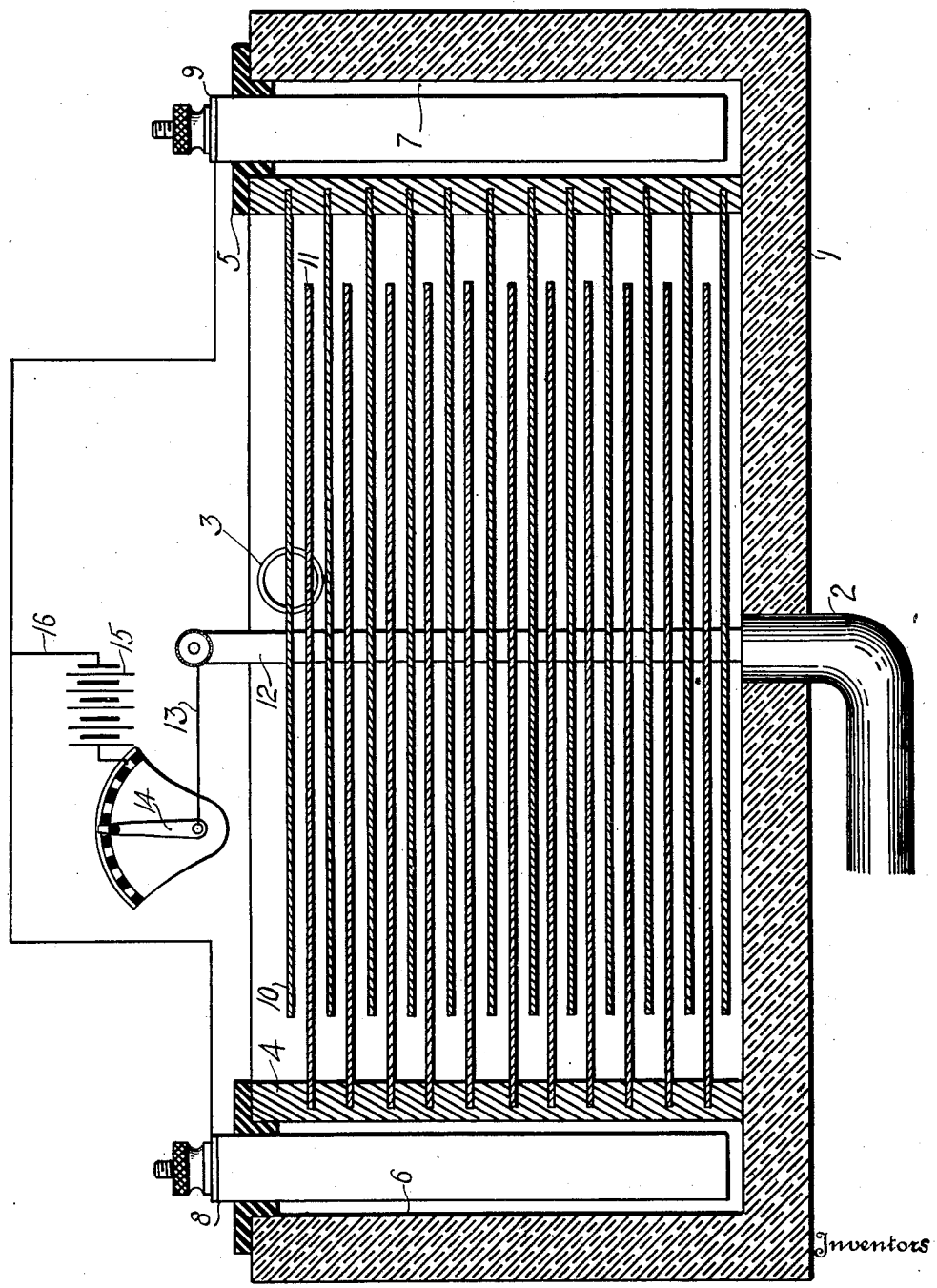
Inventors
Dwight T. Ewing, Frank H. Lyons,
By Samuel H. Davis,
Attorney Patented Apr. 28, 1931

1,802,640

UNITED STATES PATENT OFFICE

DWIGHT T. EWING AND FRANK H. LYONS, OF LANSING, MICHIGAN

PROCESS FOR THE OXIDATION OF LEUCO BASES FOR DYES

Application filed October 7, 1927. Serial No. 224,728.

This invention relates to processes for the oxidation of leuco-bases for dyes by means of an electric current, and includes special apparatus for carrying out the process hereinafter described.

The different leuco-bases of dyes are recognized chemical compounds produced by recognized processes, and such producing processes form no part of this invention.

The process comprising this invention is believed to be a new and useful method of oxidizing the leuco-base into the corresponding carbinol base by electro-chemical action.

The drawing forming a part of this application is a vertical sectional view of the preferred form of the electrolytic cell for carrying out this process invention.

Throughout the drawing and description the same number is used to refer to the same part.

In carrying out this invention, the leuco-base is dissolved in sulphuric acid with or without the addition of acetic acid. Acetic acid is necessary to give a product which will produce a crystalline dye. The sulphuric solution is then diluted to form a sufficiently dilute fluid of the desired volume. This solution is then passed through an oxidizing cell to which is applied a current of electricity having the necessary voltage and quantity to oxidize the leuco-base into the corresponding carbinol base. The carbinol base is then precipitated, washed and filtered. The steps of precipitating, washing and filtering the carbinol base constitute no portion of this invention as they are well known operations.

As an example of the operations followed in carrying out this invention, fifty grams of leuco-base were dissolved in 110 grams of sulphuric acid. The solution was diluted to make 1200 cc. and placed in the anode compartment of the cell. A current of 15 amperes for two hours was passed through the cell. The temperature was 55 degrees C. A carbon electrode was used. No catalytic agent was employed. After the run the product was neutralized with NaOH and a good product obtained. The catalytic agent has been dispensed with; no stirring was necessary, and the solution is maintained at substantially 55 degrees C. by the heat given off due to the resistance of the cell. It was found that the addition of acetic acid will produce a very high grade product.

The apparatus essential for the carrying out of this process invention comprises as illustrated in the drawings, a cell 1 made of wood suitably prepared, brick, cement or other material that will withstand the action of the chemicals.

The cell has an inlet 2 and outlet 3 one of which is located at the top and the other at the bottom of the cell.

Two diaphragms 4 and 5 partition the cell as shown, and form the end compartments 6 and 7 within which are suitably supported the cathodes 8 and 9.

The anodes are horizontal lead plates 10 and 11, and it will be noted that one end of each plate is carried by a diaphragm. This invention is not limited to that construction. The plates 10 and 11 are so arranged that the fluid from inlet 2 must pass against and around each overlying plate until the outlet 3 is reached. The path thus interposed in the cell as the course which the fluid must take, is made very long, and it is such elongation of the path that is thought to be of advantage in this invention, operating as it does to bring about the complete oxidation of the leuco-base continuously being passed through the cell.

In the drawings it is shown that the lead plates are joined by a common vertical connector bar 12, which by a conductor 13 may be connected to the switch 14 which may be arranged to interrupt the current or to introduce for or less resistance therein. From the switch 14 the connection is made with the battery 15, or other source of current, and by way of the branching conductor 16 the connection is made with the cathodes 8 and 9.

In the operation of this invention, it is believed that an inspection of the drawings will show that the fluid in passing through the cell must follow a very unusually long path. It is thought obvious that the speed with which the fluid moves or is moved may be controlled as desired by a variety of devices of well known character and not necessary to be illustrated in this application.

Having now described this invention and explained the manner of its operation, we claim:—

A continuous electrolytic process for the oxidation of leuco-bases capable of forming when oxidized coloring matter soluble in the fluid employed, consisting in dissolving the leuco-base in a solution of sulphuric acid, moving the solution back and forth in a horizontal direction through a much elongated path, subjecting the entire solution to the action of an electric current, and removing and replacing at desired intervals portions of the materials acted upon.

In testimony whereof we affix our signatures.

DWIGHT T. EWING.
FRANK H. LYONS.